US 8,544,674 B2

(12) United States Patent
Nilsson

(10) Patent No.: US 8,544,674 B2
(45) Date of Patent: Oct. 1, 2013

(54) COMBINED LID AND SIEVE FOR A SHAKER

(76) Inventor: Mikael Nilsson, Västerås (SE)

( * ) Notice: Subject to any disclaimer, the term of this patent is extended or adjusted under 35 U.S.C. 154(b) by 100 days.

(21) Appl. No.: 13/010,940

(22) Filed: Jan. 21, 2011

(65) Prior Publication Data
US 2012/0061398 A1 Mar. 15, 2012

Related U.S. Application Data

(63) Continuation-in-part of application No. 29/375,518, filed on Sep. 23, 2010, now Pat. No. Des. 646,919.

(30) Foreign Application Priority Data

Sep. 10, 2010 (EM) .................. 1001753609-0001
Sep. 10, 2010 (EM) .................. 1001753609-0002
Sep. 10, 2010 (EM) .................. 1001753609-0003

(51) Int. Cl.
*B01F 11/00* (2006.01)
(52) U.S. Cl.
USPC ... 220/568; 220/212; 220/254.8; 220/592.14; 220/705; 220/710; 220/713; 220/718; 206/217; 215/11.1; 215/11.6; 215/384; 215/388; 222/129; 222/145.5; 222/146.6; 222/189.06; 366/130
(58) Field of Classification Search
USPC ............... 220/212, 254.8, 568, 592.17, 705, 220/710, 713, 718; 206/217; 215/11.1, 11.6, 215/384, 388; 222/129, 145.5, 146.6, 189.06; 366/130
See application file for complete search history.

(56) References Cited

U.S. PATENT DOCUMENTS

| 3,820,692 | A | * | 6/1974 | Swett et al. .................. 222/547 |
| 5,919,365 | A | * | 7/1999 | Collette ....................... 210/419 |
| 6,095,033 | A | * | 8/2000 | Melton ....................... 99/323.3 |
| 6,332,704 | B1 | * | 12/2001 | Gasser et al. ................. 366/130 |
| 7,571,830 | B2 | | 8/2009 | Lin | |
| 2003/0002385 | A1 | | 1/2003 | Pola et al. | |
| 2008/0035646 | A1 | * | 2/2008 | Smith ......................... 220/526 |

FOREIGN PATENT DOCUMENTS

| GB | 327661 | | 4/1930 | |
| GB | 441515 | | 1/1936 | |
| GB | 2442593 | | 2/2009 | |
| GB | 2454759 | * | 5/2009 | ............. A45F 3/16 |

OTHER PUBLICATIONS

Webpage from www.consumerlink.com.

* cited by examiner

*Primary Examiner* — Anthony Stashick
*Assistant Examiner* — Elizabeth Volz
(74) *Attorney, Agent, or Firm* — Dilworth & Barrese, LLP

(57) ABSTRACT

A shaker has a container body, lid and sieve, with the lid and sieve detachably securable to one another, separate and apart from the lid and container body being detachably securable together. A substantially U-shaped track is situated around an internal surface of the lid to receive a mating projection of the sieve so that the sieve and lid can be snapped together in complementary fashion and detachably secured together by a snap fit.

14 Claims, 3 Drawing Sheets

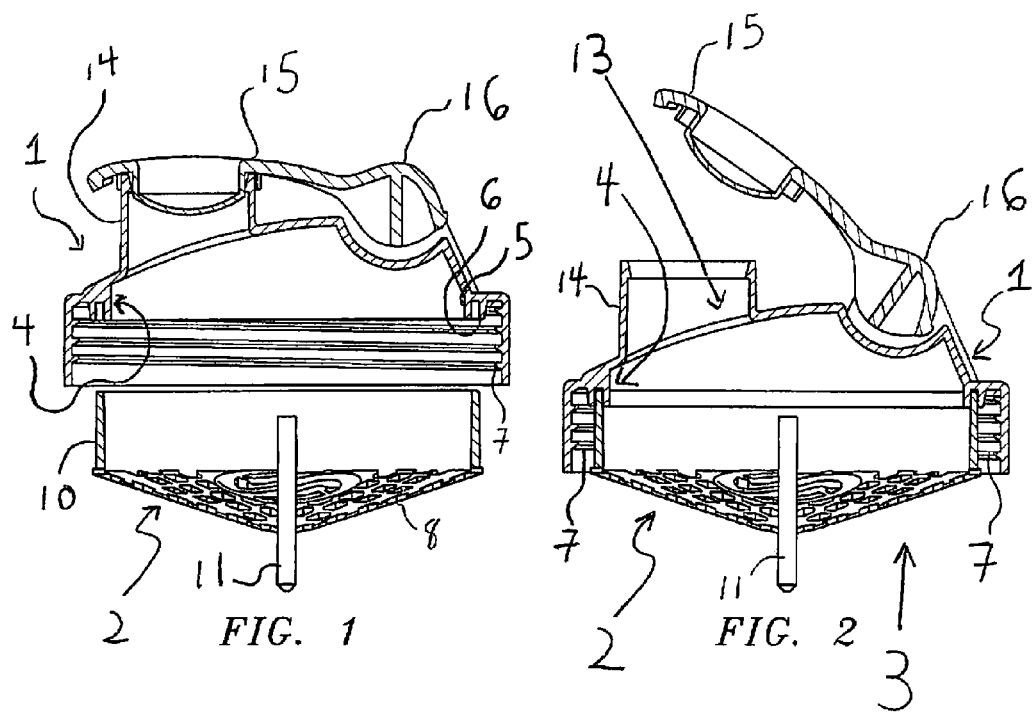
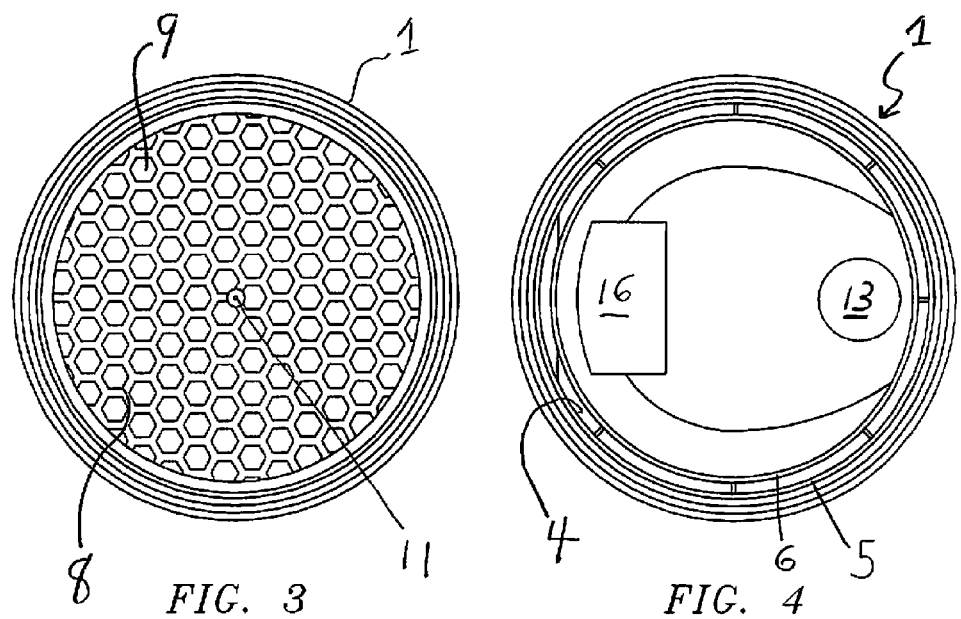

COMBINED LID AND SIEVE FOR A SHAKER

BACKGROUND OF THE INVENTION

The present invention is directed to a combined lid and sieve for a shaker. More specifically, the present invention is directed to a combined lid and sieve which can be detachably secured together, separate and apart from being secured to any other components of the shaker.

Awareness is growing for need to imbibe nutritional supplements during or after intensive exercise workout to both enhance effectiveness of such exercise and replenish nutrients lost during such workouts. Such nutritional supplements include, but are not limited to, protein, creatine and vitamin supplements, and may take the form of powder, pills or capsules. Generally, these nutritional supplements should be mixed with and dissolved in water shortly before imbibing to ensure maximum effectiveness. To this end, portable shakers have been developed for mixing such nutrients in water, followed by shaking to dissolve the same and drinking, either directly from the shaker itself or after being poured into a glass.

A shaker generally comprises a shaker body itself, a lid removably coupled to the shaker body and sieve situated within the shaker body, to facilitate pulverizing and dissolving of the nutritional contents when added to liquid within the shaker body and shaken. Mixing of the nutritional contents normally requires the shaker body to be placed on a stable surface, e.g., a counter top, especially when previously-filled with liquid to avoid spilling. The (powder) contents are then added to the shaker body, followed by introducing the sieve and then securing the lid on top of the shaker body which is then thoroughly shaken to ensure thorough mixing and dissolving of the nutritional contents.

Then, the lid must be removed from the shaker body, followed by removal of the sieve placed therein, with the thus-dissolved nutritional supplement then ready for drinking by an individual, either directly from the shaker body or after being poured into a separate glass. Ideally, the nutritional supplemental should be mixed immediately prior to drinking for maximum effect. Therefore, there is a need to facilitate quick imbibing of the thus-prepared nutritional supplement after intensive exercise and which is not always possible due to location of the exercise. More specifically, a stable surface for readily-mixing the nutritional solution might not be readily available, e.g., outdoors or in a gym where an individual might be exercising up an exercise bicycle.

SUMMARY OF THE INVENTION

Accordingly, it is an object of the invention to facilitate imbibing or ingesting nutrients, especially during or after an exercise workout.

It is a more specific object of the present invention to enhance mixing of nutrients in liquid, especially prior to immediate use.

It is another object of the present invention to provide for mixing of solid in liquid minimizing the number of separate components required to ensure such mixing.

These and other objects are explicitly attained by the present invention which is directed to a shaker for mixing, e.g., a nutritional supplement to be imbibed, in which a lid is detachably secured to a container, and a sieve is configured to be detachably secured to the lid, i.e., independently from securing the lid and container together. In particular, the lid and sieve are secured together with a snap-fit. The lid can have a substantially U-shaped track to receive a corresponding mating projection on the sieve, in additional to be separately screwed together with the container.

The present invention facilitates preparing the requisite nutritional supplement for drinking on-site, e.g., while an individual is sitting on an exercise bicycle, by simply unscrewing the lid from the container body, the internal sieve thus remaining adhered to the lid upon separating from the container body. The nutrient is then simply added to the container body, the lid with the sieve then re-secured thereto, followed by shaking to ensuring as much of the solid nutrient as possible dissolves in the liquid within the container. The thus-dissolved nutrient is then immediately ready for drinking directly from the shaker, e.g., by unplugging a spout on top of the lid. Presence of the sieve during shaking ensures as much of the nutrient as possible is pulverized and dissolves in the liquid.

BRIEF DESCRIPTION OF THE DRAWINGS

The invention will be described in greater detail with reference to the accompanying drawings in which FIG. 1 illustrates an exploded sectional view showing the lid and sieve uncoupled from one another, FIG. 2 illustrates a sectional view similar to FIG. 1 and showing the lid and sieve coupled together and also showing the spout on top of the lid unplugged;

FIG. 3 illustrates a bottom view in the direction of arrow 3 in FIG. 2;

FIG. 4 illustrates a bottom of the lid similar to FIG. 3 but without the sieve and lid coupled together;

DESCRIPTION OF THE PREFERRED EMBODIMENTS

Figures 5, 6:
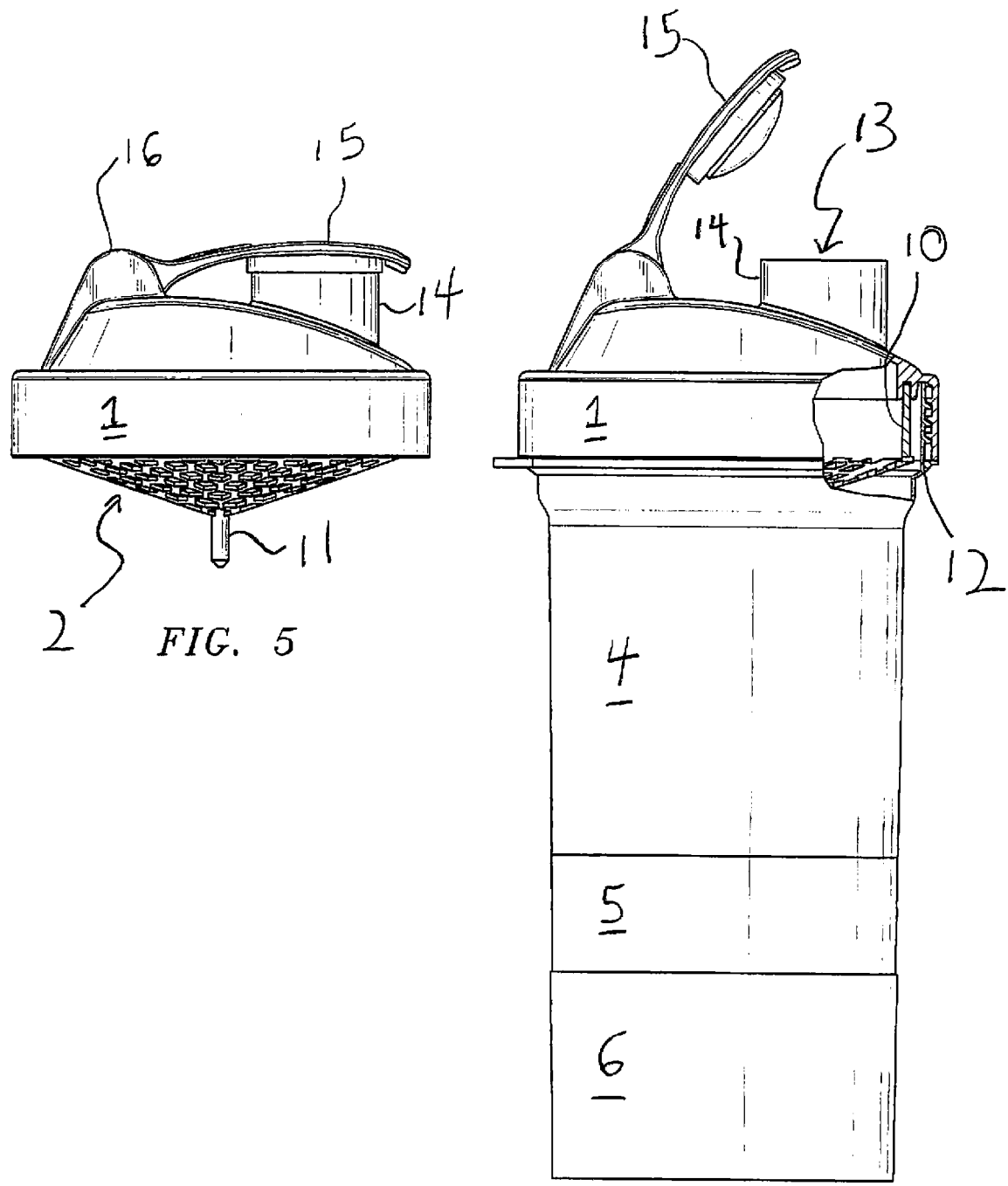
FIG. 5 illustrates an elevational view from an opposite side shown in FIG. 2 and showing the lid and sieve coupled together.
FIG. 6 illustrates an elevational view, partially in section, and showing the coupled lid and sieve shown in FIG. 5 mounted upon and secured to the container, and also illustrating coupling of the lid to the container in the exposed sectional portion.

Referring the drawings, the lid 1 of the present invention is molded from plastic such as polyethylene and comprises a substantially U-shaped track 4 situated around an internal surface thereof and configured to receive a mating projection 10 of the sieve 2 in a snap fit, such that the lid 1 and sieve 2 are detachably secured together. The lid 1 also comprises an internal thread 7 spiraling around an interior circumference thereof and arranged to threadingly mate with an external thread 12 spiraling around an outer circumference of the container 4, so that the lid 2 and container 4 can be screwed together, separately from coupling of the lid 1 and sieve 2 together.

In particular, the substantially U-shaped track 4 is defined by a pair of concentrically-positioned projections 5, 6 with respect to one another and defining the U-shaped track substantially in the form of an annular or concentric circle around an internal surface of the lid 1 when viewed in the direction of arrow 3 in FIG. 2, i.e., as illustrated in FIG. 4, namely in the direction the sieve 2 is snap-fit into engagement with the lid 1. This direction is substantially normal to the direction the internal thread 7 spirals along the internal circumference of the lid 1 as illustrated in FIGS. 1, 2 and 4.

The sieve 2 itself comprises a substantially conical portion 8 containing holes 9 (to facilitate mixing of powder 100 as described further infra) and a substantially cylindrical portion 10 protruding away from conical portion 8 and constituting the mating projection 10 configured to seat in the substantially U-shaped track 4 within the lid 1, with a snap fit. The holes 9 are illustrated having substantially hexagonal cross-section, although these holes 9 make have any convenient configuration, e.g., circular cross-section. Additionally, the sieve 2 has a stem 11 axially-extending through an apex of the conical portion 8 to facilitate gripping when securing or detaching the lid 1 and sieve 2.

The lid 1 itself also has a spout 13 extending therethrough and opening on a side of the lid 1 opposite a side receiving the sieve 2. A collar 14 is concentrically-provided around this spout 13 to facilitate drinking from the coupled lid 2 and container 4 as described further infra. Additionally, the spout 13 is pivotally-closed by a plug 15, i.e., also in a snap-fitting manner, with plug 15 mounted at pivot or fulcrum 16 also situated on the side of the lid 1 opposite the side receiving the sieve 2. Thus, the spout 13 can be securely covered to avoid spilling liquid therefrom when not in use for drinking. At the same, collar 14 is configured to securely receive plug 15 in a detachable manner and also facilitate drinking from the container 4 and lid 1 when the plug 15 is removed from the spout 13.

Figure 7:
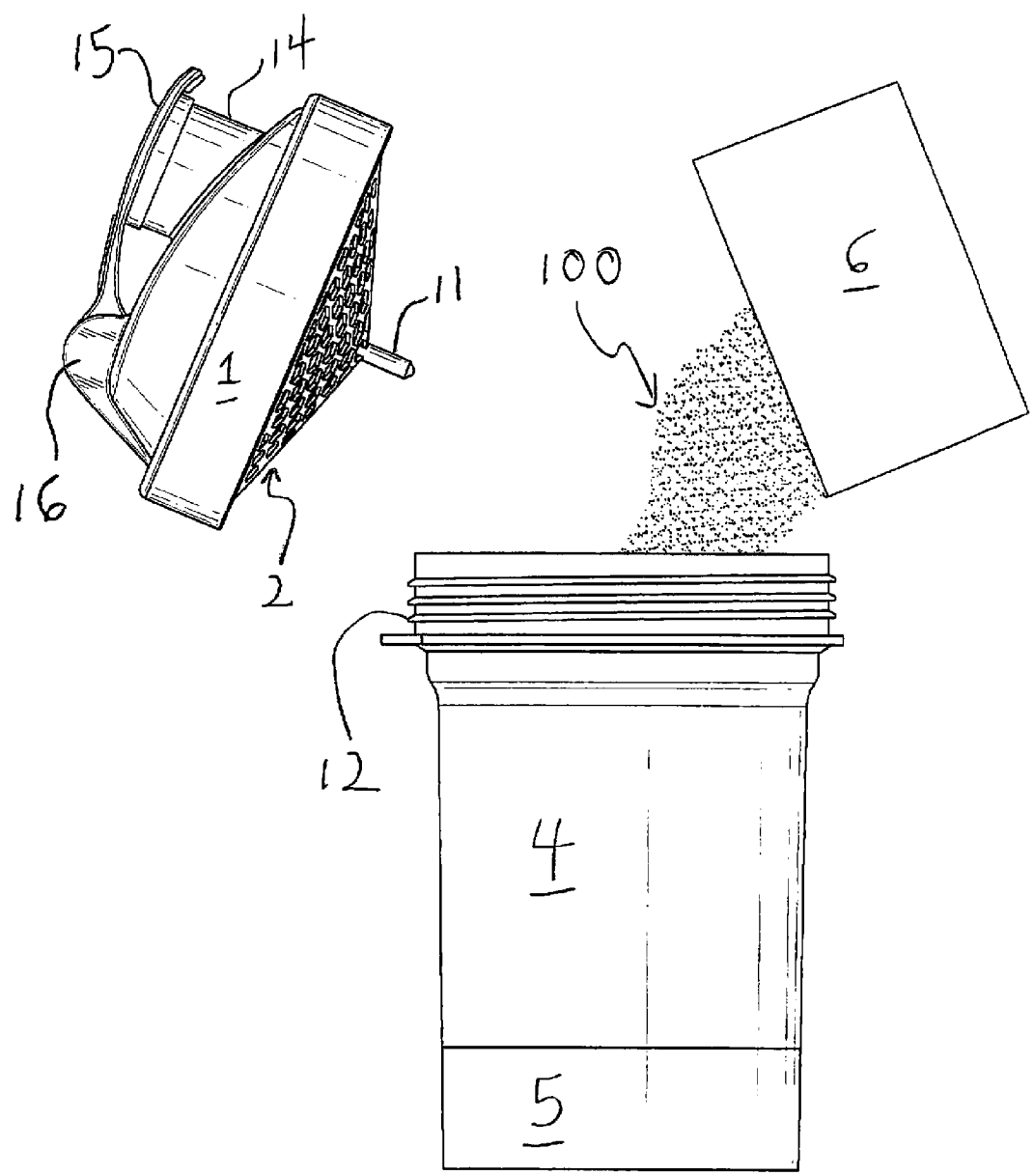
FIG. 7 schematically illustrates mixing of contents from one of the compartments coupled to the container body into the container body itself, in accordance with the present invention.

The container 4 itself has a main body 4 containing, e.g., liquid such as water for drinking and also has as illustrated in FIG. 7 two separate compartments 5 and 6 which are detachably secured to the bottom thereof, e.g., by screw threads (not illustrated) and arranged to contain contents such as powder for mixing with the liquid contained in the main container body 4. More specifically, a first compartment 5 is screwed onto the main container body 4, with a second compartment 6 then screwed onto the first compartment 5. While the embodiment herein illustrates two additional compartments 5 and 6 detachably secured to the main container body, the container forming part of a shaker in accordance with the present invention can have any number of additional compartments, e.g., just one additional compartment 5 or even more than two additional compartments 5 and 6. Additionally, each of these individual compartments might also containing further means for dividing the respective compartment into further compartments, e.g., a removable +-shaped divider (not illustrated), for containing different additives such as pills to be ultimately-dissolved in the liquid in the container body.

The present invention facilitates mixing of powder contents with liquid in the shaker because the number of loose components is minimized. More specifically, as illustrated in FIG. 8, when powder 100 is to be mixed in liquid, e.g., water, already added to main container body 4, the bottom compartment 6 containing powder is simply unscrewed from the intermediate compartment 5. At the same time, the lid 1 containing the sieve 2 secured thereto, is simply unscrewed from the main container body 4 as illustrated in FIG. 8, with the contents 100 of bottom compartment 6 then added to the main container body 4. The lid 1 having the sieve 2 secured thereto is then screwed back onto the main container body 4, the bottom compartment 6 optionally screwed back onto the bottom of the container, i.e., first compartment 5, and with the container 4 then shaken to ensure the added contents 100 thoroughly mix with and become dissolved in the liquid contained in the main container body 4.

Once thoroughly-mixed, the thus-prepared solution can be easily imbibed from the shaker by simply pivoting or "popping" open the plug 15 to expose spout 13. Should any powder 100 remain undissolved in the liquid, the sieve 2 ensures only finely-pulverized, non-dissolved powder capable of passing through the sieve-holes 9 could be imbibed by an individual.

The sieve 2 provides the critical effect of enhancing pulverizing of the powder contents 100 as the container 4 and lid 2 are shaken. In this regard, the stored contents 100 can be swiftly mixed into liquid stored in the main container body 4, followed by shaking and then ultimately-drinking the thus-mixed contents, with minimal steps, e.g., even without availability of a hard surface to set out all components of the shaker such as a counter top, because the sieve 2 and lid 1 securely-adhere to one another. Thus, for example, an individual can easily mix the powder contents 100 with the liquid while sitting on an exercise bicycle after intensive exercising, to quickly imbibe a protein supplement. Inadvertent spilling either the powder contents or liquid is minimized.

The container body 4 and additional compartments 5 and 6 are manufactured from hard plastic such as polypropylene, while the sieve 2 itself is molded from plastic such as polypropylene. Additionally, preferred dimensions of the components forming the invention include a diameter of approximately 40-150 mm, for the container body 4 and additional compartments 5 and 6, a length or height of about 200 mm, for the container body and 10-100 mm, for each of the container compartments 5 and 6, a diameter of about 40-150 mm, and height of about 10-150 mm, for the lid 1, a diameter or about 40-150 mm, and height of about 1-100 mm, for the cylindrical portion 10 of the sieve 2 and a conical radius of about 40-150 mm, for the conical portion 8 of the sieve 2.

In particular, the width of substantially U-shaped track 4 is approximately 0.5-3 mm, while the width of concomitant cylindrical portion 10 of sieve 2 is approximately 0.5-3 mm., thus ensuring both secure snap-fit of lid 1 and sieve 2 together, and, at the same, ease of detaching the sieve 2 and lid 1 from one another, e.g., for storing or cleaning. The height of cylindrical portion 10 (about 1-100 mm.) of the sieve 2 provides stability when the sieve 2 is placed, by itself, on lop of the container body 4 without being secured to the lid 1; the strainer or sieve 2 does not wobble in this instance, when provided with cylindrical portion 10.

The preceding description of the present invention is merely exemplary and not intended to limit the scope thereof in any way. For example, the cylindrical portion of the sieve might be provided with the substantially U-shaped track and the internal surface of the lid with the corresponding mating projection, within the purview of the present invention. Additionally, the sieve and lid can be secured together by other means, e.g., by screwing together analogously to securing the lid and container together as shown herein.

What is claimed is:

1. A lid configured to be detachably secured to a container, and comprising
  a sieve configured to be detachably secured to the lid, and
  means for detachably securing said lid and sieve together and separately detachably securing the lid to the container, wherein
  said means comprise a curved, substantially U-shaped track concentrically situated around an internal surface of the lid and configured to receive a mating projection of the sieve such that the sieve and lid can be snapped together in complementary fashion and detachably secured together by a snap fit, and
  said sieve comprises a substantially conical portion containing a matrix of holes and a substantially cylindrical portion situated around an outer edge of said conical portion remote from an apex of said conical portion and protruding away from said conical portion, said substantially cylindrical portion arranged to seat in said curved, substantially U-shaped track concentrically mounted within said lid.

2. The lid of claim 1, wherein said substantially U-shaped track comprises a pair of projections together defining a substantially U-shaped recess concentrically or annularly situated therebetween.

3. The lid of claim 1, wherein said sieve additionally comprise an axial stem protruding through both internal and external sides of an apex of said conical portion.

4. A lid configured to be detachably secured to a container, and comprising a sieve configured to be detachably secured to the lid, and means for detachably securing said lid and sieve together and separately detachably securing the lid to the container, wherein said means comprise an internal thread around an interior circumference of the lid for threadingly mating with an external thread positioned around an outer circumference of the container, such that the lid and container can be screwed together, said means additionally comprise a curved, substantially U-shaped track concentrically situated around an internal surface of the lid in a direction substantially normal to the direction said thread extends and configured to receive a mating projection of the sieve such that the sieve and lid can be snapped together in complementary fashion and detachably secured together by a snap fit, and said sieve comprises a substantially conical portion containing a matrix of holes and a substantially cylindrical portion situated around an outer edge of said conical portion remote from an apex of said conical portion and protruding away from said conical portion, said substantially cylindrical portion arranged to seat in said curved, substantially U-shaped track concentrically mounted within said lid.

5. The lid of claim 4, wherein said substantially U-shaped track comprises a pair of projections together defining a substantially U-shaped recess concentrically or annularly situated therebetween.

6. The lid of claim 4, wherein said sieve additionally comprise an axial stem protruding through both internal and external sides of an apex of said conical portion.

7. The lid of claim 4, additionally comprising a spout extending through the lid and opening on a side of the lid opposite a side receiving the sieve.

8. The lid of claim 7, additionally comprising a plug pivotally mounted upon the side of the lid opposite the sieve-receiving side thereof and configured to detachably snap into said spout to close the same.

9. The combination of a container and lid configured to be detachably coupled and secured together, additionally comprising a sieve configured to be detachably secured to the lid separately from the container, and means for detachably securing said lid and sieve together and separately detachably securing the lid to the container, wherein the sieve is configured to be detachably secured to the lid by a snap fit, said means comprise an internal thread around an interior circumference of the lid for threadingly mating with an external thread positioned around an outer circumference of the container, such that the lid and container can be screwed together, and a curved, substantially U-shaped track concentrically situated around an internal surface of the lid in a direction substantially normal to the direction said thread extends and configured to receive a mating projection of the sieve such that the sieve and lid can be snapped together in complementary fashion and detachably secured together by the snap fit, and said sieve comprises a substantially conical portion containing a matrix of holes and a substantially cylindrical portion situated around an outer edge of said conical portion remote from an apex of said conical portion and protruding away from said conical portion, said substantially cylindrical portion arranged to seat in said curved, substantially U-shaped track concentrically mounted within said lid.

10. The combination of claim 9, additionally comprising at least one separate compartment detachably secured to said container at an end opposite said lid.

11. The combination of claim 10, additionally comprising two separate compartments, a first compartment being detachably secured to said container at the end opposite said lid and a second compartment being detachably secured to said first compartment at an end thereof opposite an end of said first compartment detachably secured to said container.

12. The combination of claim 9, wherein the lid comprises a spout extending through the lid and opening on a side of the lid opposite a side receiving the sieve, and a plug pivotally mounted upon the side of the lid opposite the sieve-receiving side thereof and configured to detachably snap into said spout to close the same.

13. The combination of claim 12, additionally comprising at least one separate compartment detachably secured to said container at an end opposite said lid.

14. The combination of claim 13, additionally comprising two separate compartments, a first compartment being detachably secured to said container at the end opposite said lid and a second compartment being detachably secured to said first compartment at an end thereof opposite an end of said first compartment detachably secured to said container.

* * * * *